United States Patent [19]
Stengel et al.

[11] Patent Number: 5,265,270
[45] Date of Patent: Nov. 23, 1993

[54] METHOD AND APPARATUS FOR PROVIDING POWER CONSERVATION IN A COMMUNICATION SYSTEM

[75] Inventors: Robert E. Stengel, Ft. Lauderdale; Ronald E. Sharp, Plantation, both of Fla.; Francis R. Yester, Arlington Heights, Ill.

[73] Assignee: Motorola, Inc., Schaumburg, Ill.

[21] Appl. No.: 709,044

[22] Filed: Jun. 3, 1991

Related U.S. Application Data

[63] Continuation-in-part of Ser. No. 607,427, Oct. 31, 1990, abandoned.

[51] Int. Cl.$^5$ .............................................. H04B 1/16
[52] U.S. Cl. .................... 455/343; 455/38.3; 340/825.44
[58] Field of Search ............ 455/35.1, 38.1, 38.2, 455/38.3, 67.1, 226.2, 226.3, 212, 343; 340/825.44; 370/92, 93

[56] References Cited

U.S. PATENT DOCUMENTS

| | | | |
|---|---|---|---|
| 4,663,623 | 5/1987 | Lax et al. | 340/825.44 |
| 4,964,121 | 10/1990 | Moore | 370/100.1 |
| 4,995,099 | 2/1991 | Davis | 455/343 |
| 4,996,526 | 2/1991 | DeLuca | 340/825.44 |
| 5,001,471 | 3/1991 | Snowden et al. | 340/825.21 |
| 5,001,776 | 3/1991 | Clark | 455/226 |
| 5,027,428 | 6/1991 | Ishiguro | 455/343 |
| 5,109,530 | 4/1992 | Stengel | 455/38.3 |

*Primary Examiner*—Reinhard J. Eisenzopf
*Assistant Examiner*—Chi Pham
*Attorney, Agent, or Firm*—Pedro P. Hernandez

[57] ABSTRACT

A communication device 200 capable of operating in a communication system 100 having a control system which generates information signals with redundant information is disclosed. The communication device comprises: a receiver 214 for receiving the information signals; a circuit which can determine the signal quality of the received information signals 234; and a controller 226 which decodes the received information signals, and further compares the signal quality of the information signals with a predetermined value, and decides if the received signal quality is at least equal to the predetermined value in order to only decode a portion of the information signal. Upon the communication device decoding a portion of the information signal, the communication device 200 is placed in a battery saving mode in order to conserve battery life.

26 Claims, 7 Drawing Sheets

|     | D0 | D1 | D2 | D3 | D4 | D5 | D6 | D7 | D8 | D9 | D10 | D11 |     |
|-----|----|----|----|----|----|----|----|----|----|----|-----|-----|-----|
|     | 1  | 0  | 1  | 0  | 0  | 0  | 1  | 0  | 0  | 1  | 0   | 1   |     |
| G0  | 1  | 1  | 1  | 1  | 1  | 0  | 0  | 1  | 0  | 0  | 1   | 0   | 0   |
| G1  | 0  | 1  | 1  | 1  | 1  | 1  | 0  | 0  | 1  | 0  | 0   | 1   | 0   |
| G2  | 1  | 1  | 0  | 0  | 0  | 1  | 1  | 1  | 0  | 1  | 0   | 0   | 1   |
| G3  | 0  | 1  | 1  | 0  | 0  | 0  | 1  | 1  | 1  | 0  | 1   | 1   | 1   |
| G4  | 0  | 0  | 1  | 1  | 0  | 0  | 0  | 1  | 1  | 1  | 0   | 1   | 1   |
| G5  | 1  | 1  | 1  | 1  | 1  | 1  | 1  | 1  | 0  | 1  | 0   | 1   | 1   |
| G6  | 0  | 1  | 0  | 0  | 1  | 1  | 1  | 0  | 1  | 0  | 1   | 0   | 1   |
| G7  | 0  | 0  | 1  | 1  | 1  | 0  | 0  | 1  | 0  | 0  | 0   | 1   | 0   |
| G8  | 1  | 0  | 0  | 1  | 1  | 1  | 0  | 0  | 1  | 1  | 0   | 0   | 0   |
| G9  | 1  | 0  | 0  | 0  | 1  | 0  | 0  | 1  | 0  | 1  | 1   | 1   | 1   |
| G10 | 0  | 0  | 1  | 0  | 0  | 0  | 0  | 1  | 1  | 0  | 1   | 0   | 1   |

METHOD AND APPARATUS FOR PROVIDING POWER CONSERVATION IN A COMMUNICATION SYSTEM

CROSS REFERENCE TO RELATED APPLICATIONS

This is a continuation-in-part of copending application Ser. No. 07/607,427 filed Oct. 31, 1990, abandoned.

TECHNICAL FIELD

This invention relates generally to the field of communication systems, and more particularly to communication devices which can enter into a battery saving mode.

BACKGROUND

Communication systems, as they are known in the art, include systems such as radio communication, paging, cellular telephone, and other similar types of systems. It is common for communication systems such as these to generate information signals which are redundant in nature due to the addition of error correction and detection bits, the addition of redundant information packets, and other similar techniques that help increase the probability of communication devices which are utilizing the system to receive the transmitted information. In trunked radio system specifically, a trunked central controller sends information signals in the form of signalling words to a plurality of radios which are part the system in order to coordinate their activities. The central controller will ordinarily create convolutional coded signalling words which contain error correction bits, and error detection bits. The central controller also duplicates the signalling words in order to increase the chances of the radios in the system receiving the information signals. This is especially helpful in radio communication systems which are prone to interference.

Trunked radio systems, as they are known in the art, allocate communication resources amongst users of the system. A resource controller or control system (also commonly referred to as the trunked central controller) for a trunked radio system transmits control information to trunked radios which are on the system, usually over a control resource (also known as the control channel). A trunked portable radio receiving a particular control channel detects instructions from the central controller that might, for example, instruct the radio to shift to a particular communication channel (repeater) whereupon the radio (subscriber unit) can transmit and receive voice and/or data information on the particular channel which has been assigned.

Other trunked systems, for example, may not utilize a dedicated control channel and transmit the control information over all the repeaters (or channels) available in the system.

In a trunked system, such as the SMARTNET TM trunked radio system manufactured by Motorola, Inc., signalling words (normally referred to as outbound signalling words hereafter referred to as OSWs) are generated by the system central controller and are then transmitted over the control channel continuously to all of the portable radios in the system. The OSWs inform specific radios or groups of radios when to move to one of the channels available on the system, and also informs the radios of other important system information. The OSWs are comprised of a string of data bits which carry system information to the radios. The portable radios on a trunked system spend a great deal of the time receiving the information from the control channel and decoding the received information in order to determine if any information is directed to the specific radio. When the system is in an idle state, all radios in the system have their receivers monitoring the control channel for information thereby remaining synchronized with the control channel.

In the SMARTNET TM system the outbound signalling words (OSWs) generated by the central controller have redundant data bits in the form of error correction and detection bits which approximately double the length of each of the OSW packets. The OSWs are then run through a convolutional algorithm such as is known in the art, which makes each OSW a ½ rate convolutional code data string. By having a ½ rate convolutional code, the system increases the correction of burst errors of up to 19 consecutive bits. The central controller will also normally repeat each of the OSW packets several times in order to increase the chances of reception by the portable radios. While the addition of redundant error correction/detection bits, and the repetition of the OSWs increase the chances for the radios in the system to receive the OSWs, even under noisy channel environments, they decrease the battery life of the radios since the radios need to spend a great deal of time receiving redundant information. Since under normal system conditions the radio frequency channels are normally "clean" enough for the radios to receive the OSWs without any problems, a need exists for a way of minimizing the amount of time radios spend decoding the OSWs in order to gather all the information the radios require, and thereby extending the battery life of the radios.

Communication systems which utilize a nonsynchronous coded squelch such as DIGITAL PRIVATE LINE TM (DPL TM, trademark of Motorola, Inc.) also have the same problems of the communication device spending too much time decoding the incoming cyclic information. The DPL TM code is a (23, 12) cyclic Golay code used to provide a private line for the communication device receivers. A need for a faster decoding algorithm which can conserve battery life on these types of systems is also required in order to allow the communication devices to operate for longer periods of time.

SUMMARY OF THE INVENTION

Briefly, according to the invention, a communication device decodes only a portion of the redundant information signals which are received when the signal quality of the received signal is of a level at least equal to a predetermined value.

In one aspect of the present invention the communication device goes into a battery saving mode for a predetermined period of time upon decoding the portion of the information signals.

In still another aspect of the present invention, the communication device enters the battery saving mode only after determining that the decoded information signals are not directed to the device.

A method for receiving data from information signals is also disclosed which comprises the steps of: receiving at the communication device the information signals, determining the signal quality of the received signals, comparing the quality of the received signals to a predetermined value, and decoding only a portion of the received signals when the signal quality of the received signals is at least equal to the predetermined value.

In still another aspect of the present invention a communication device for use in a communication system having cyclic nonsynchronous information signals, comprises a receiver for receiving the cyclic nonsynchronous information signals, a means for determining the signal quality of the received cyclic nonsynchronous information signals and a decoder for decoding the cyclic nonsynchronous information signals. The communication device also includes a control means for comparing the signal quality of the received cyclic nonsynchronous information signals with a predetermined value and for actuating the decoder in order to decode only a portion of the received cyclic nonsynchronous information signals when the signal quality of the received cyclic nonsynchronous information signals is at least equal to the predetermined value.

BRIEF DESCRIPTION OF THE DRAWINGS

FIG. 5A is a table showing the parallel processing of the 12 data bits in order to generate the 23 bit coded squelch code word in accordance with the present invention.

FIG. 5B shows how the resulting valid coded squelch code is determined from the 23 bit coded squelch code word in accordance with the present invention.

DETAILED DESCRIPTION OF THE PREFERRED EMBODIMENT

Figure 1:
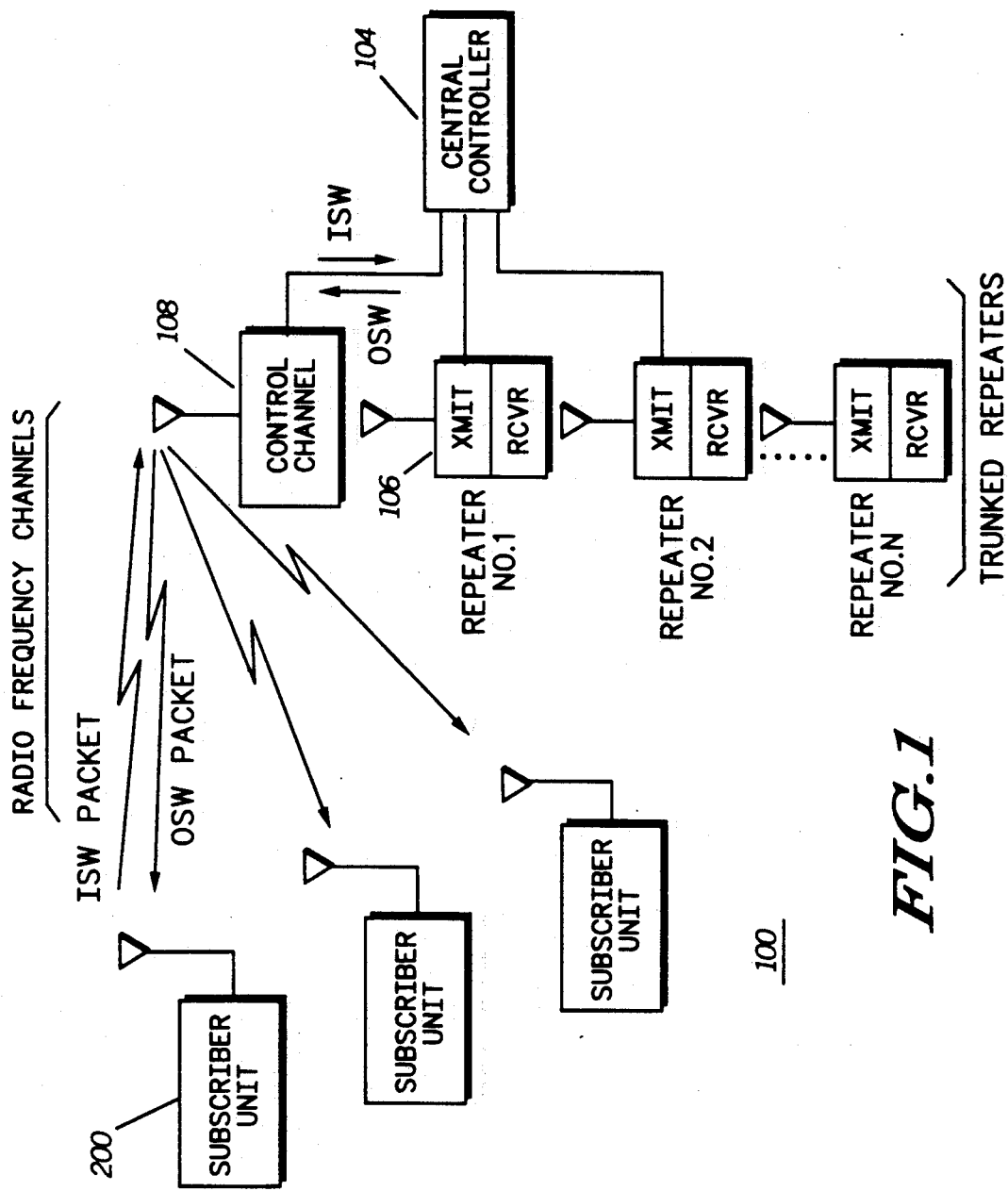
FIG. 1 is a diagram of a trunked radio system which can utilize the present invention.

Referring to FIG. 1, a representation of a trunked communication (radio) system 100 according to the present invention is shown. The trunked radio system 100 consists of a control system which is commonly referred to as a central controller 104, preferably a SMARTNET TM central controller manufactured by Motorola, Inc. which controls the assignment of repeaters 106, which are preferably MSF 5000 TM repeaters manufactured by Motorola, Inc. to different groups of communication devices or as they are referred to subscriber units 200. To better understand the system 100, an example of the sequence of events for a standard radio group call will be described. When one of the subscriber units (portable radios) 200 (i.e. in radio group A) that is in the system 100 presses his push-to-talk button (PTT), a burst of data is transmitted by the radio to the central controller 104 via the system control channel 108. The data sent is normally referred to as an inbound signalling word or ISW, which in this case constitutes a request for a voice channel. Preferably, any of the repeaters 106 except the one acting as the control channel 108 can be a voice/data channel 106. The central controller 104 upon reception of the ISW reviews the status of all the repeaters 106 and assigns an unused repeater 106 by sending an information signal, or as it is more commonly referred to, an outbound signalling word (OSW) via the control channel 108 directing all radios 200 in group A to a frequency corresponding to one of the repeaters 106 (i.e. repeater No. 1 or also known as channel No. 1). The outbound signalling word is received by all radios 200, but only the radios 200 in group A will be transferred to repeater No. 1 (106). Since the OSW contains information regarding which radios 200 the information is for, the other radios 200 in the system will continue to monitor the control channel 108 for OSWs, until they receive an OSW which is directed to them. The individual radio 200 which activated the PTT is now able to talk to any radio 200 in his group over repeater No. 1 (106).

Other implementations of trunked radio systems for use with the current invention can include systems 100 which do not have a dedicated control channel 108, but use each of the channels 106 in the system to transmit the necessary system control information. Other systems which can utilize the present invention can include cellular telephone systems, paging systems, and other closely related systems which transmit information signals to communication devices.

The present invention utilizes the fact that the central controller 104 continuously generates OSWs to the radios 200, with a lot of the bits which make up the OSWs being redundant error correcting or detection bits, and also the fact that the OSW packets are duplicated several times by the central controller 104 in order to increase the chances of reception by the radios 200. A radio 200 by first measuring the signal quality of the received information signals (OSWs), preferably by a conventional method such as by measuring the signal strength of the received signals. The signal strength measurement is then compared to a predetermined level which is preferably stored in the radio 200 to determine if the signal level is strong enough for the radio to decode a portion of the received information signals. Other methods of measuring the signal quality of the incoming signals include determining the signal to noise ratio of the incoming signals, determining the bit error rate of the incoming information signals, and other similar methods known in the art. Once the portion of the information signal is decoded the radio 200 can go into a battery saving mode in order to substantially increase the radios 200 battery life.

Figure 2:
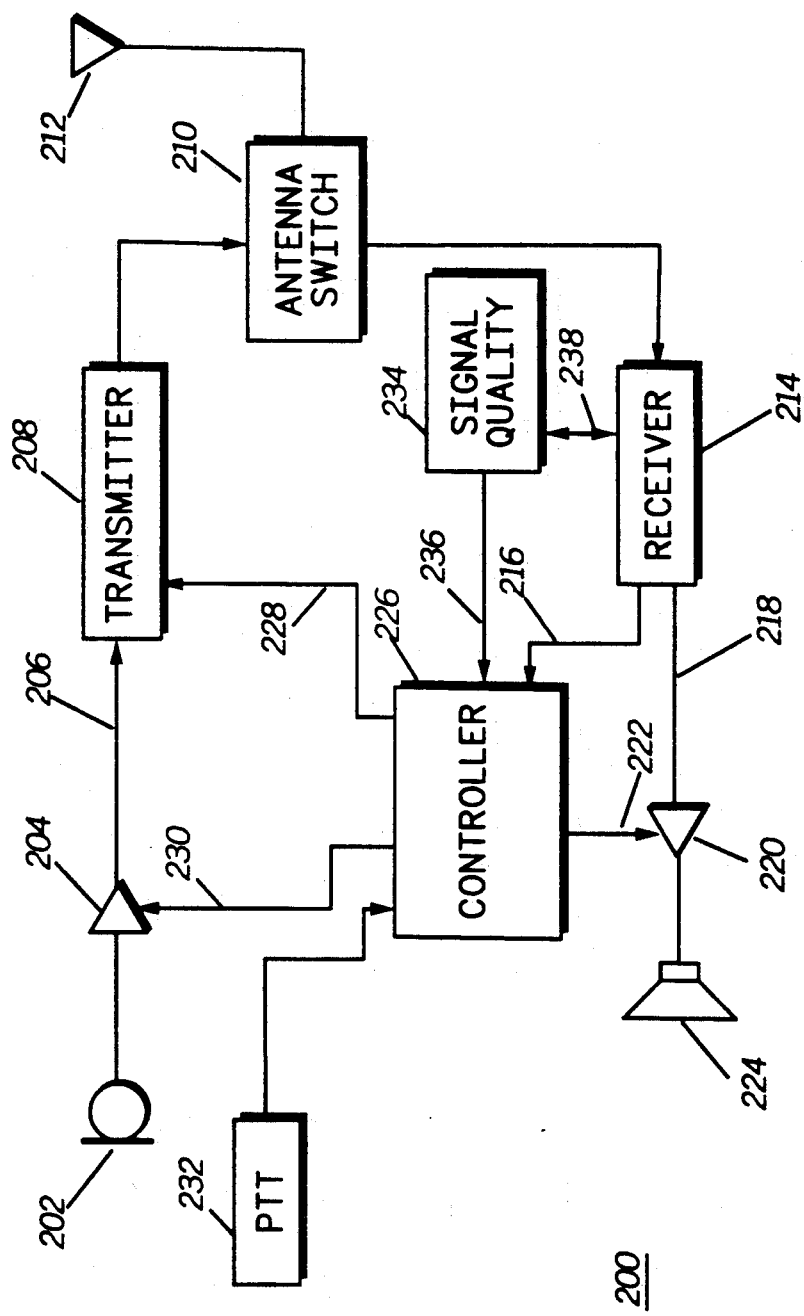
FIG. 2 is a block diagram of a portable radio in accordance with the present invention.

FIG. 2 is a block diagram of a conventional portable radio 200 capable of operating in a trunked system 100. In accordance with the present invention, the radio 200 includes a receiver 214, and an antenna switch 210 to selectively couple the antenna 212 to either the receiver 214 or transmitter 208. Both the receiver 214 and transmitter 208 are of conventional design as known in the art. To receive a message, a radio frequency signal is routed from the antenna 212 to the receiver 214. The receiver provides radio information signals to the controller 226 in the form of data messages via line 216. The receiver 214 can also provide voice messages via line 218 which are coupled to amplifier 220 for presentation to the speaker 224. The amplifier's 220 gain can be controlled by the controller 226 via line 222. The radio 200 includes a control means such as a controller 226. The controller 226 preferably comprises a MC68HC11F1 microcontroller, having on-chip timer circuitry, control circuitry, memory, serial interface, I/O lines, and capability of interfacing to external memory devices if necessary. The controller 226 processes the incoming received signals from the receiver 214 via line 236. The controller 226 acts as a decoder by decoding the the received information signals (OSWs) using conventional decoding software which is known in the art. The decoding software is stored in memory which is part of the controller 226. The decoder could also be implemented using a separate microprocessor and appropriate software which would be coupled to the receiver. The decoder software can be controlled by controller 226 using an executive radio software routine which is also stored in controller 226.

OSWs are continuously being generated by the system central controller 104, and transmitted preferably over the control channel 108, which the receiver 214 receives. The OSW usually contains information relating to what radios the signalling word is addressed to, type of call, channel assignment, and other related information. Each OSW packet generated by the system central controller 104 usually takes no more than 23 milliseconds to complete, and are continuously ongoing. Once a radio 200 detects that an OSW is directed to it, it will go to the channel 106 which it is been assigned to, and stay until instructed to go back to the control channel 108.

The present invention utilizes the fact that only a portion of the OSWs need to be decoded by the radio controller 226 in order for the radio 200 to decode all the data contained in the OSWs (information signals). This is due to the fact that the OSWs are ½ rate convolutional packets, and also that the system duplicates the OSWs several times. By utilizing a conventional signal quality measurement circuit 234 such as a conventional signal strength measurement circuit which can determine the signal quality of the incoming received signals a better probability can be had that the portion of the decoded OSWs are free from errors, and thereby can be relied on. The signal strength measurement circuitry 234 is coupled to receiver 214 via line 238 and to controller 226 via line 236, in order for the controller 226 to decide if the signal strength of the incoming signal is above the stored threshold. The signal strength circuit 234 can also be implemented as part of the receiver 214. The controller 226 compares the signal quality in this case the signal strength of the incoming signals with a predetermined value stored in controller 226. Once a radio 200 determines that the signal strength of the received information signal is at least equal to the value stored in the controller 226, the controller 226 actuates the decoder software to decode only a portion of the incoming signals. The controller 226 can also decided only to decode a portion of the received signals only when the received signals is not directed to the specific radio 200. The signal quality measurement circuit 234 can use other criteria for determining the signal quality of the received signals such as by comparing the bit error rates of the incoming signals to a predetermined rate threshold, and other similar techniques known in the art.

The controller 226 can place the radio 200 in a battery saving mode upon decoding the portion of the received information signals for a predetermined period of time. The predetermined period of time can be stored in the controller 226, and can be a conventional count down timer. The battery saver mode could be any of those known in the art. A suitable battery saving technique that could be used with the present invention is U.S. Pat. No. 4,381,552 by Nocillini, which discloses a "Standby Mode Controller Utilizing Microprocessor" which is hereby incorporated by reference. Preferably, the battery saving mode can include turning the receiver 214, transmitter 208, and any other circuits in the radio 200 "off" or into a standby low current drain condition using the controller 226 which would stay on in order to bring the radio 200 back on after a predetermined period of time. The controller 226 can have I/O lines which can control the power to each of the circuits in the radio 200. The greater the number of circuits in the radio 200 which are turned off, or put into standby modes, the greater the battery savings while in the battery saving mode. A simple battery saving mode can include just not receiving any information for a period of time (turning the receiver 214 off), thereby saving current by staying in a standby mode. Another battery saving technique can be to stop decoding the received information signals by halting the decoding program which is stored in controller 226. By going into the battery saver mode, the portable radio 200 can consume much less power and conserve its battery life. The only circuitry that would preferably be required to be left "on" would be the timer and other associated circuitry found in the controller 226. Preferably, the radio 200 will go into the battery saver mode for a predetermined period of time which would preferably be no longer than approximately 20 millisecond in duration. The actual duration in the battery saving mode will depend mostly on the repetition rate of the incoming redundant information signals. Alternatively, the duration the radio 200 stays in the battery saver mode could be sent via the information signals themselves, and be decoded by the radio controller 226. In this method the system controller 104 could determine how long to keep particular radios 200 in the battery saver mode.

The present invention can be incorporated into a transceiver by including a transmitter 208. To transmit inbound information signals (ISWs) to the central controller 104, the radio controller 226 sends data messages via line 228 which are then transmitted by transmitter 208. Alternatively, voice messages can be transmitted as well. The radio user speaks into microphone 202 after "keying up" the transmitter by pressing the push-to-talk (PTT) 232 which activates transmitter 208. The voice message gets amplified by amplifier 204 which can be controlled by the controller via line 230. The voice messages are then coupled to transmitter 208 via line 206.

Figure 3A:
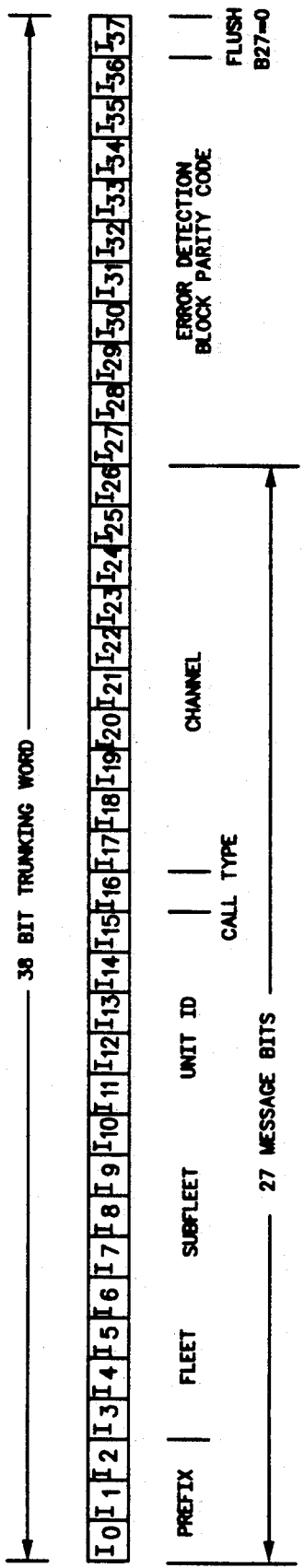
FIG. 3A is a diagram of a typical trunking word structure.

FIG. 3A illustrates a 38 bit trunking word which is the building block for the 84 bit OSWs (information signals) which are generated by the system controller 104. The 38 bit trunking word includes 27 bits of actual message information (data), which consists of; the radio group (e.g. fleet, subfleet) the message is for, the type of message, and the channel information. The other 11 bits of the trunking word are mainly used for error detection and are generated using a conventional error detection algorithm which is known in the art.

Figure 3B:
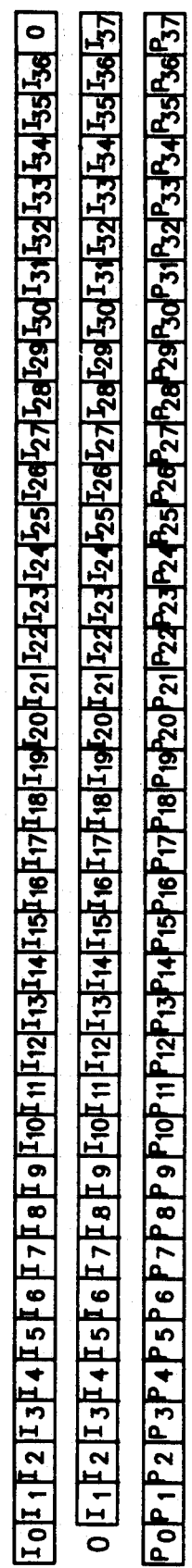
FIG. 3B is an illustration of a ½ rate convolutional code.

FIG. 3B shows how the 38 bit trunking word is increased to a 76 bit word having error correction bits of redundancy by taking the previous trunking word shown in FIG. 3A and performing an "exclusive OR" of $I_n$ the top row, and $I_{n+1}$ middle row, which yields a result of Pn (parity) bottom row, which is a ½ rate convolutional code as known in the art of $I_n$ and $I_{n+1}$.

Figure 3C:
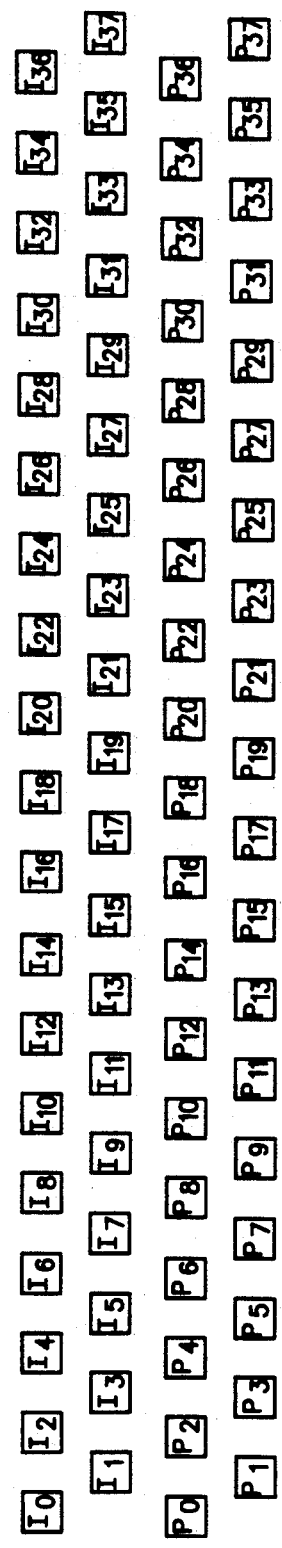
FIG. 3C is an exploded view of both even and odd information and parity bits segments which make up the OSW packet.

FIG. 3C shows the 76 bit convolutional code of FIG. 3B broken down into 4 segments of 19 bits, the first segment being the even information bits, the second segment being the odd information bits, the third being the even parity bits, and the bottom segment being the odd parity bits. The parity bits being picked from the convolutional code result of FIG. 3B (Pn) and the information bits being the 37 information bits of FIG. 3A.

Figure 3D:
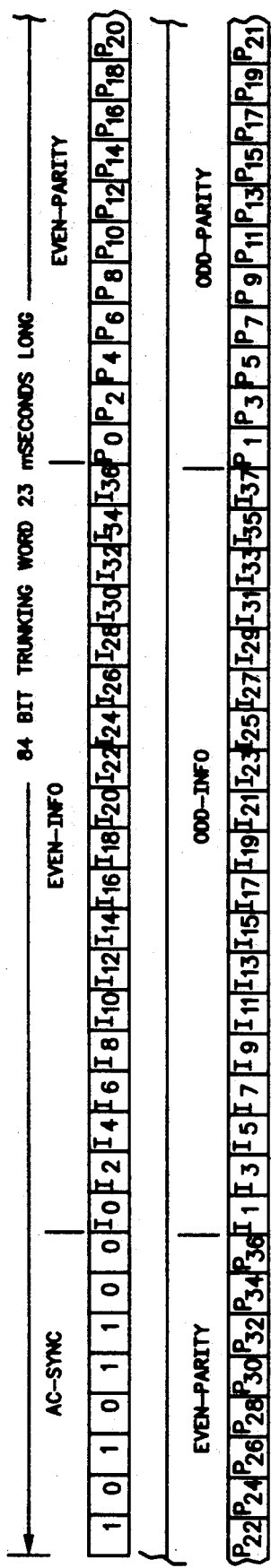
FIG. 3D is an illustration of an OSW packet in accordance with the present invention.

FIG. 3D shows how the 76 bits of FIG. 3C are made into the standard 84 bit long OSW used in system 100 by appending 8 synchronization bits to the 76 previous bits. The synchronization bits are used by the radios 200 in order to synchronize the incoming OSW data bits. The central controller 104 generates the OSWs and sends them to the control channel 108 for transmission once they have been generated. It takes approximately 23 milliseconds to transmit an OSW packet as shown in FIG. 3D. The OSW is comprised of 8 synchronization bits, 19 even information bits, 19 even parity bits, 19 odd information bits, and 19 odd parity bits. The interleaving of the even information, even parity, odd information, and odd parity bits results in correction for a burst error of up to 19 consecutive bits, with a one incorrect out of four algorithm. This is due to the built-in code redundancy of the generated OSWs.

Figure 3E:
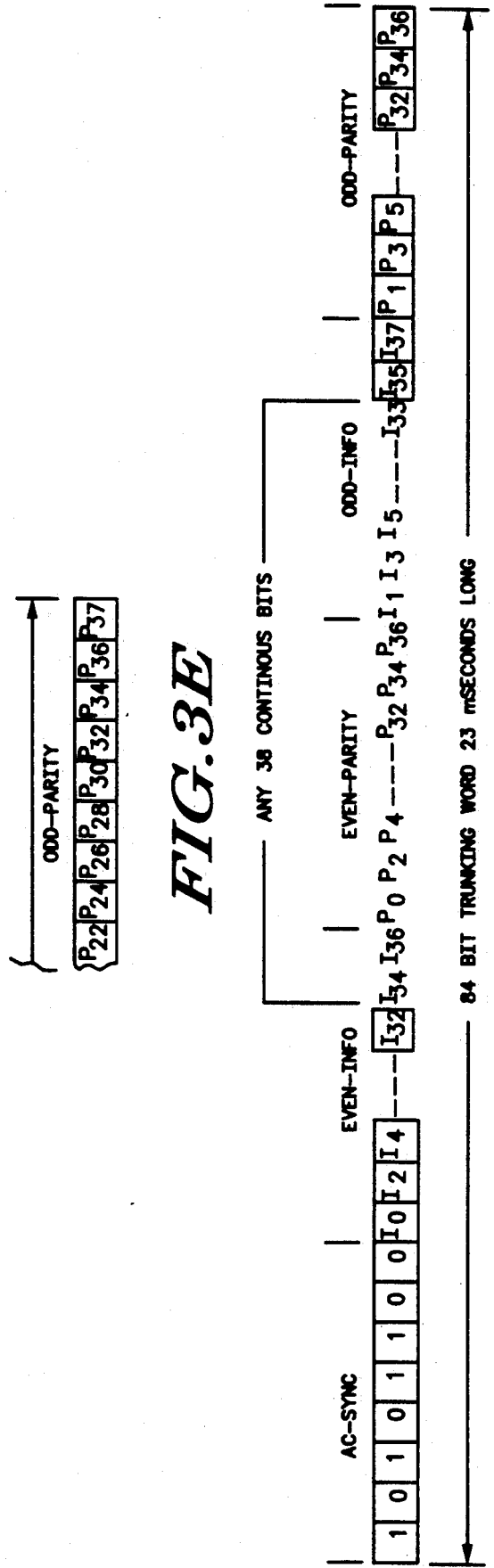
FIG. 3E is a diagram showing how any continuous bit stream portion can be used to get all the information required by the radio in accordance with the present invention.

FIG. 3E shows that by taking any continuous 38 bits (any adjacent 19 bit blocks) portion of the incoming OSW packets all the required information can be decoded by the radio 200. This is due to the fact that the 84 bit OSWs have been previously convoluted from the original 38 bit trunking word (FIG. 3a). The radio 200 first determines the signal quality of the received signals and determines by way of the signal strength circuitry 234 if the signal strength is equal to or above the required threshold which is preferably stored in controller 226. If the signal quality is good enough, then the radio 200 can decode any continuous 38 bits and enter a battery savings mode as long as the decoded information is not directed to the particular radio 200. For example, the radio 200 can once it has determined that the signal strength of the received signals is of a sufficient level, the decoder would turn "on" under the control of controller 226 to detect odd information, odd parity of OSW #1, and sync, even information, and even information for OSW #2. If the unit information that is decoded by controller 226 from OSW #2 is for some other radio 200, the radio can be placed in a battery saving mode until the next OSW approximately 23 milliseconds later. If the decoded data is directed to radio 200 it can act upon the information, for example, go to one of the voice channels 106.

Figure 3F:
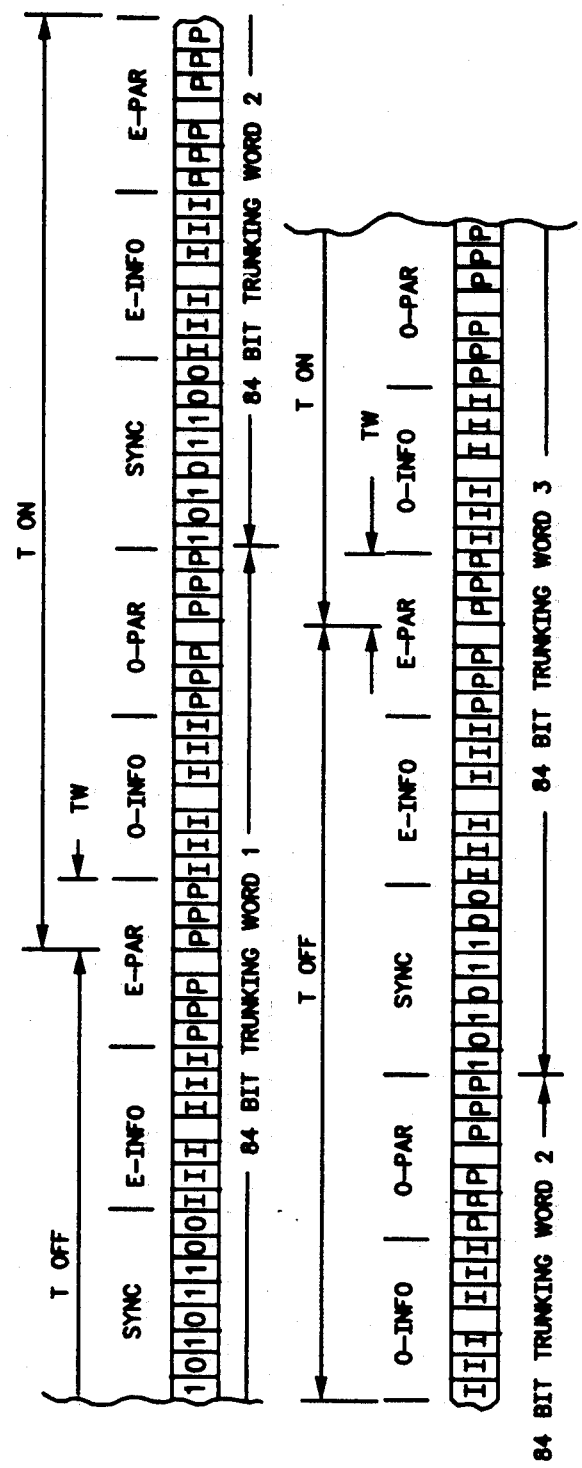
FIG. 3F is a battery saver mode flow diagram in accordance with the present invention.

FIG. 3F shows a typical flow of how the radio 200 would detect the OSWs and go into the battery savings mode. In this figure the detection is done across two consecutive duplicate OSWs. Preferably, a typical cycle would start (assuming the radio was starting out coming out of a "sleep mode" or battery saving condition) by the receiver going through an approximately 3 millisecond warm-up period which is depicted as $T_W$. The three milliseconds allows the receiver to turn on and be ready to receive information. After the warm-up period the radio receives the OSW information for 23 milliseconds at which time the radio 200 determines the signal quality of the received signal and decodes the information in order to decide if the information is for the particular radio 200. If the information contained in the OSW is not for the radio 200 the radio goes into a battery saving mode or $T_{OFF}$ period which lasts for approximately 20 milliseconds as long as the quality of the incoming signal was at least equal to a predetermined value stored in controller 226. The cycle is continuously repeated as long as the signal to noise ratio (signal quality) is at least equal to the stored threshold and the decoded information is not directed to the particular radio. If the signal to noise ratio is below the threshold, the radio 200 will continue to receive the incoming signals determine the signal quality, and decode the information, until at which point the signal quality has improved. Also, if the decoded OSW signal is directing the radio 200 to one of the voice channels 106 the process is halted until the radio returns from the channel 106 to monitor the control channel 108 once again.

For a portable radio 200 having a 1-9-90 duty cycle (1% transmit, 9% receive, and 90% standby) a battery drain reduction of approximately 20 to 35% can be achieved by use of the present invention. This is due to the fact that the radio 200 can be almost totally turned off for 20 milliseconds and turned on for 26 milliseconds.

In summary, the radio 200 receives the incoming information signals (OSWs), then determines the signal quality of the received OSWs. The quality of the received signals is then compared to a predetermined value by the radio control means, controller 226. If the quality is at least as good as the stored value, the controller 226 only decodes a portion of the received signals and goes into a battery saving mode. Preferably, the battery saving mode includes turning off all the circuits in the radio 200 except for the controller 226 which is running a timer. Once the timer expires, the radio powers back up and begins to receive control channel 108 information (OSWs) once again. The above mentioned cycle is repeated until information is decoded which is directed to the radio 200. The portion of the information signals which are decoded contain all the data required by the radio. This data includes all the information carried by the 27 message bits.

One skilled in the art can see that by designing different bit orders for the OSWs which are generated by the central controller 104, greater battery improvements can be reached with slight degradation in overall system performance (i.e. receiver warm-up times, etc.). Other methods of using the present invention can be designed in order to maximize battery savings on specific systems. By knowing the specifics of the particular system at hand, an OSW bit pattern can be developed which can maximize battery life for the communication devices (radios) 200 in the system 100.

The present invention can also be implemented on different types of communication systems such as systems were the radio signalling information is sent over all of the voice/data channels 106 and systems which use other forms of signalling information schemes. For example, the present invention can be applied to DIGITAL PRIVATE LINE TM a form of digital coded squelch (also known as DPL TM ) or similar sub-audible tone coded squelch signaling systems (e.g. PRIVATE LINE TM , PL TM ), where there is redundant information in the signalling word. The DPL TM code is a nonsynchronous (23,12) cyclic code which provides a digital coded squelch for radio receivers. Digital coded squelch allows radios to stay in a squelched position until the receiver detects a valid digital code, informing radio 200 that the message is directed to it. Of the 23 bits in the code, 12 bits are information bits and 11 are parity bits, thereby a similar process for saving battery life as described above can be implemented.

Receiver access delay is the time delay from application of a signal at the receiver antenna, to the output of the carrier squelch detector or valid coded squelch detector which is part of receiver 214. For digital coded squelch the access delay for present day radio decoders is approximately 170 milliseconds minimum. The present invention provides for a reduction in the access delay to approximately 80 milliseconds for the detection of a valid coded squelch code.

Reduction of receiver standby energy consumption is provided by periodically powering down (sleep mode) all or portions of the radio circuitry (e.g. transmitter 208, portions of receiver 214, etc.). As the ratio of sleep time to receiver "on" time increases the energy consumption decreases. However, the receiver access delay or "dead time" increases with increased receiver sleep duration. Receiver access delay or "dead time" is the inactive period when receiver 214 is unable to detect and process a received information signal, and is the sum of the receiver sleep time, warm-up time, and carrier detect and/or coded squelch valid code detection time.

The 171.3 millisecond long digital coded squelch code is continuously encoded on the transmitted signal at 134.4 bits per second by transmitting radios or base stations. Present day radios require all 23 bits of the receiver detected digital coded squelch code, which is correlated (compared) by controller 226 with the expected code. Normally this is done by buffering the 23 bits that have been received by receiver 214 and comparing these bits with another set of bits (the valid digital coded squelch code) stored in controller 226. A valid coded squelch decision results with 20 bits of correlation across the 23 bit code word, or three bits in error.

If the probability of a 10 dB or lower received signal carrier to noise ratio (C/N) ratio is small (e.g. higher than 10 dB as determined by signal quality circuit 234), then a faster digital coded squelch decoding algorithm can be utilized. For strong signal environments (C/N>10 dB), where the probability of digital coded squelch bit errors is low, the entire 23 bit code word can be determined by applying a parity generator to any consecutive correct 12 detected bits (this is for a 23,12 cyclic code like DPL TM , different number of bits would be required for other types of codes).

Figure 4A:
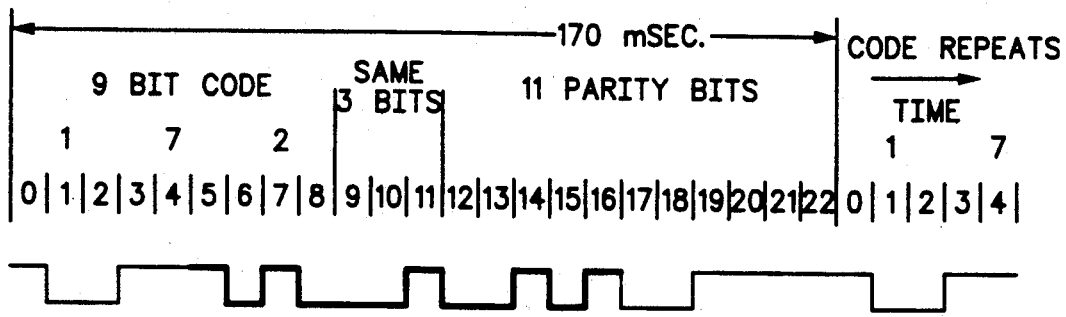
FIG. 4A is a diagram of a typical coded squelch code word.

In FIG. 4A a diagram of a typical digital coded squelch code word 400 is shown. Bits 5-16 (12 bits) have been high-lighted in order to show how the present invention operates. In the preferred embodiment bit locations 9-11 will always have the same bit pattern of "001" which will be used to synchronize the nonsynchronous digital code squelch words that are decoded by communication device 200. A parity generator having the following formula is used to serially process the detected bits:

$$g(x) = x^{10} \oplus x^7 \oplus x^4 \oplus x^3 \oplus x^2 \oplus x \oplus 1$$

The above parity generator performs an exclusive-or logic function operation on bit locations 10, 7, 4, 3, 2, 1, and 0. Although the preferred embodiment uses the above parity generator algorithm, those skilled in the art will realize that other algorithms may be implemented in other situations.

The high-lighted bits (bits 5-16) in the bit flow of FIG. 4A, represent the first 12 bits out of the receiver coded squelch detector found in receiver 214 that have been recovered after radio 200 has come out of a "sleep" mode (some of the circuits in radio 200 being turned off). Starting with bit $D_0$ (the first bit detected) through bit $D_{11}$, the detected bits are serially processed with the parity generator algorithm (shown above), to obtain the additional 11 bits of the 23 bit code. The parity generator as shown above can take the form of a software routine which is stored and executed by controller 226. The incoming coded squelch bits which are decoded are sent via line 216 to controller 226 for processing.

Figure 4B:
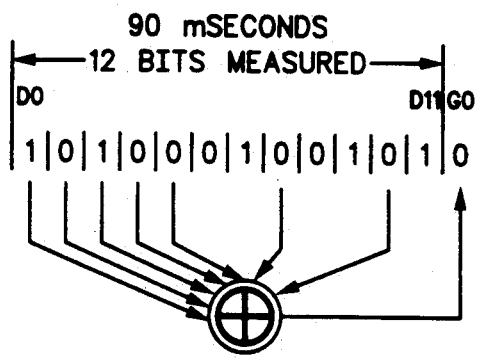
FIG. 4B is an illustration of a 12 bit section of the coded squelch code word of FIG. 4A going through a parity generator and generating a first resultant bit.
Figure 4C:
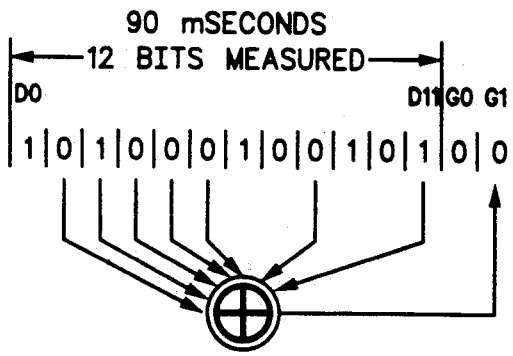
FIG. 4C is an illustration of a 12 bit section of the coded squelch code word of FIG. 4A going through the parity generator and generating a second resultant bit.

FIG. 4B shows an illustration of the 12 bit section of the digital coded squelch code word of FIG. 4A, going through the parity generator and generating a first resultant bit $G_0$. In FIG. 4C an illustration of the digital coded squelch code word of FIG. 4A going through the parity generator and generating a second resultant bit $G_1$ is shown. This process of serially running the bits through the parity generator is continued until, as shown in FIG. 4D, the complete 23 bit digital coded squelch word is generated by using the parity generator.

Figure 4D:
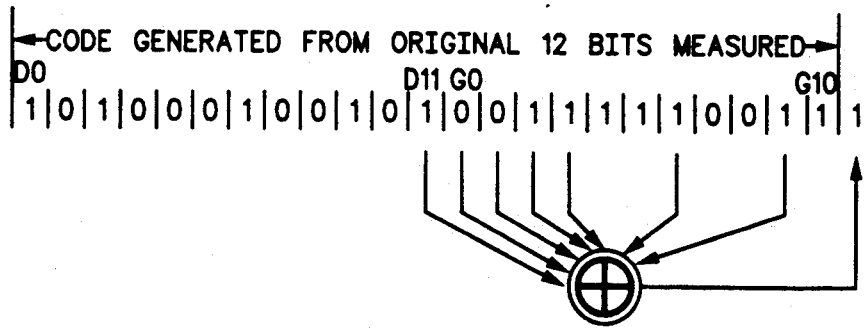
FIG. 4D is an illustration showing how the 23 bit coded squelch word is generated by processing 12 continuous bits through the parity generator in accordance with the present invention.

The parity generator can be simplified from a serial process as shown in FIGS. 4B-4D to a parallel process as shown in FIG. 5A. In FIG. 5A a table showing the processing of the 11 parity bits from the 12 detected bits in parallel is shown. The 12 data bits across the top of table 500 are "anded" (an "and" logic function) with the generator row bits $G_0-G_{10}$. These bits are then "exclusive ored" (exclusive-or logic function) with each other for the generator result in the right most column of table 500. At this point the full 23 bits of the code (as was similarly done in a serial fashion in FIGS. 4B-4D) have been determined. However, in both the serial and parallel processes shown in FIGS. 4B-4D and 5A the bit position or "word sync" in unknown since the coded squelch words are cyclic nonsynchronous codes. Using the expected resultant value of "001" in bit locations 9, 10, and 11 respectively, word sync can be obtained. One skilled in the art will realize that different bit values or different bit locations could be used to create this word sync.

The above parity generator can be rewritten to solve for the eleven unknown bits independently ($G_0-G_{11}$). In FIG. 5A for example, resultant bits $G_2$ and $G_8$ can be solved after the reception of ten consecutive bits ($D_0-D_9$), as the dashed boxes in FIG. 5A represent. Similarly, resultant bits $G_0$, $G_5$, and $G_{10}$ can be solved after the reception by receiver 214 of 11 correct bits ($D_0-D_{10}$). This spreads the comparison processes done by controller 226 over three bits ($D_9-D_{11}$). In other words, after bit D9 is received a few of the comparisons can be made, after bit D10 is received a few more can be made, and so on. This in turn reduces the computation time (comparisons) done by controller 226.

In FIG. 5B the resulting digital coded squelch code is determined from the 23 bit code word that was derived serially in FIGS. 4B-4D, or in parallel fashion in FIG. 5A. Using the 23 bit resultant code word of the previous example, the "001" bit pattern occurs four times with the code resultants of 172, 724, 015, and 267. These are the codes obtained by binary to decimal conversion of the nine bits preceding the "001" bit pattern. In this particular example, only the coded squelch code of 172 is a valid code with correct parity bits. This is determined by the code resultants being correlated with the valid codes stored in controller 226. Preferably, the resultant codes are loaded into a buffer area inside of controller 226 and compared with the list of valid DPL TM codes stored in radio 200. Once a correct match is found a valid DPL TM code is determined to have occurred and radio 200 becomes unsquelched. If no valid match is found radio 200 can go back into a "sleep mode" since the transmission has a high probability of not being directed to radio 200.

The above processes result in the decoding of the coded squelch code word within approximately 90 milliseconds. For a valid code decision the process can be reduced to a correlation of the original 12 bits with the expected code (valid code) for a match. Any 12 consecutive bits are unique to only one of the possible 2048 DPL TM codes (only 83 which are routinely used). Other different coded squelch systems will have different numbers of valid code words. In the present invention the confidence level of the accuracy of the 12 bits can be increased by testing the generated bits with the received bits following the twelfth bit detected. This can be used as a measurement of the received signal quality by processing the generated (expected) bits with the detected bits.

By using the above mentioned process for coded squelch systems, which utilize nonsynchronous data bits, will result in an approximately 46% increase in the receiver off or "dead time" without an increase in the system access delay of radio 200. By increasing the receiver off time (time not decoding) an increase in radio battery savings result.

While the present invention has been described in conjunction with specific embodiments, it is evident that many alternatives, and modifications will be apparent to those skilled in the art. Accordingly, it is intended that the present invention embrace all such alternatives, modifications, and variations as fall within the broad scope of the appended claims.

What is claimed is:

1. A communication device for use in a communication system having a control system which generates code words, each code word having message information and redundant information, comprising:
   a receiver for receiving the code words;
   a means for determining the signal quality of the received code words;
   a decoder which uses a predetermined algorithm for decoding the received code words, the predetermined algorithm decodes the entire received code words in order to decode the entire message information contained within the received code words if the signal quality of the received code words is less than a predetermined value; and
   a control means for comparing the signal quality of the received code words with the predetermined value and for actuating the decoder in order to modify the predetermined algorithm in order for the decoder to decode only that portion of the received code words which will recover the entire message information contained within the received code words when the signal quality of the received code words is at least equal to the predetermined value.

2. A communication device according to claim 1, wherein the control means places the communication device in a battery saving mode for a predetermined period of time upon decoding the portion of the received code words.

3. A communication device according to claim 1, wherein the communication device is a portable radio and the communication system is a trunked communication system.

4. A communication device according to claim 1, wherein the control means compares the decoded portion of the received (information signals) code words to determine if the information is for the communication device.

5. A communication device according to claim 4, wherein the control means places the communication device in a battery saving mode for a predetermined period of time upon determining that the portion of the received code words is not directed to the communication device.

6. A communication device according to claim 2, wherein the signal quality of the received information signals is determined by measuring the signal strength of the received code words.

7. A communication device according to claim 2, wherein the signal quality of the received code words is determined by measuring the bit error rate of the received code words.

8. A communication device according to claim 2, wherein the battery saving mode consists of turning off the decoder in the communication device.

9. A communication device according to claim 2, wherein the battery saving mode consists of turning off the receiver in the communication device.

10. A communication device according to claim 2, wherein the battery saving mode consists of turning off everything in the communication device except for a timer circuit.

11. In a communication system having a control system which generates code words, each code word having message information and redundant information, the communication system having at least one communication device having a decoder which uses a predetermined algorithm for decoding the code words, a method for recovering the message information from the code words comprising the steps of:
   receiving at the communication device the code words;
   determining the signal quality of the received code words;
   comparing the signal quality of the received code words to a predetermined value;
   decoding the entire received code words using the predetermined algorithim in order to decode the entire message information contained within the code words if the signal quality is below the predetermined value; and
   modifying the predetermined algorithm used by the decoder in order for the decoder to decode only that portion of the received code words when the signal quality of the received information signals is at least equal to the predetermined value which will allow the decoder to recover the entire message information contained in the code word.

12. A method for receiving data from code words according to claim 11, comprising the further step of:
placing the communication device in a battery saving mode for a predetermined period of time upon decoding the portion of the received code words.

13. A method for receiving data from code words according to claim 11, comprising the further step of:
determining if the decoded code word is for the communication device.

14. A method for receiving data from code words according to claim 13, comprising the further step of:
placing the communication device in a battery saving mode for a predetermined period of time upon determining that the decoded code word is not directed to the communication device.

15. A method for receiving data from code words according to claim 12, wherein the battery saving mode consists of turning off everything in the communication device except for a timer circuit.

16. A method for receiving data from code words according to claim 12, wherein the signal quality of the received code words is determined by measuring the signal strength of the received code words.

17. A a method for receiving data from code words according to claim 12, wherein the signal quality of the received code words is determined by measuring the bit error rate of the received code words.

18. A portable radio for use in a trunked communication system having a control system which generates convolutional coded signaling words, each convolutional coded signaling word having message information and redundant information, comprising:
a receiver for receiving the convolutional coded signaling words;
a means for determining the signal quality of the received convolutional coded signaling words;
a decoder which uses a predetermined algorithm for decoding the received convolutional coded signaling words, the predetermined algorithm decodes the entire received convolutional coded signaling words in order to decode the entire message information contained within the received convolutional coded signaling words if the signal quality of the received convolutional coded signaling words is less than a predetermined value; and
a control means for comparing the signal quality of the received convolutional coded signaling words with the predetermined value and for actuating the decoder in order to modify the predetermined algorithm in order for the decoder to decode only that portion of the received convolutional coded signaling words which will recover the entire message information contained within the convolutional coded signaling words when the signal quality of the received information signals is at least equal to the predetermined value.

19. A portable radio according to claim 18, wherein the signal quality of the received convolutional coded signaling words is determined by measuring the signal to noise ratio of the received convolutional coded signaling words.

20. A portable radio according to claim 18, wherein the control means compares the decoded portion of the received convolutional coded signaling words to determine if the information is for the communication device.

21. A portable radio according to claim 20, wherein the control means places the communication device in a battery saving mode for a predetermined period of time upon determining that the portion of the received convolutional coded signaling words is not directed to the communication device.

22. A communication device for use in a communication system having cyclic nonsynchronous information signals, comprising:
a receiver for receiving the cyclic nonsynchronous information signals;
a means for determining the signal quality of the received cyclic nonsynchronous information signals;
a decoder for decoding the cyclic nonsynchronous information signals; and
a control means for comparing the signal quality of the received cyclic nonsynchronous information signals with a predetermined value and for actuating the decoder in order to decode only a portion of the received cyclic nonsynchronous information signals when the signal quality of the received cyclic nonsynchronous information signals is at least equal to the predetermined value, the control means follows a parity generation sequence in order to convert the portion of the received cyclic nonsynchronous information signal into a coded squelch word.

23. The communication device of claim 22, wherein the cyclic nonsynchronous information signals are coded squelch control signals.

24. The communication device of claim 22, wherein the cyclic nonsynchronous information signals are digital coded squelch signals.

25. A communication device for use in a communication system having cyclic nonsynchronous information signals, comprising:
a receiver for receiving the cyclic nonsynchronous information signals;
a means for determining the signal quality of the received cyclic nonsynchronous information signals;
a decoder for decoding the cyclic nonsynchronous information signals; and
a control means for comparing the signal quality of the received cyclic nonsynchronous information signals with a predetermined value and for actuating the decoder in order to decode only a portion of the received cyclic nonsynchronous information signals when the signal quality of the received cyclic nonsynchronous information signals is at least equal to the predetermined value; and the control means follows a parity generation sequence having the sequence of:

$$g(x) = x^{10} \oplus x^7 \oplus x^4 \oplus x^3 \oplus x^2 \oplus x \oplus 1$$

in order to convert the portion of the received cyclic nonsynchronous information signal into a coded squelch word.

26. The communication device of claim 25, wherein the cyclic nonsynchronous information signal includes at least one bit that has a predetermined value that is used by the control means to synchronize the cyclic nonsynchronous information signal.

* * * * *